United States Patent [19]
Thomas

[11] 3,759,486
[45] Sept. 18, 1973

[54] DAMPER SEAL SYSTEM

[75] Inventor: John Thomas, Louisville, Ky.

[73] Assignee: American Air Filter Company, Inc., Louisville, Ky.

[22] Filed: May 26, 1972

[21] Appl. No.: 257,085

[52] U.S. Cl. ............................................. 251/330
[51] Int. Cl. ............................................. F16k 1/44
[58] Field of Search ........................... 251/145, 330

[56] References Cited
FOREIGN PATENTS OR APPLICATIONS
924,301   2/1955   Germany ........................ 251/330

Primary Examiner—William R. Cline
Attorney—Robert W. Fletcher et al.

[57] ABSTRACT

A damper arrangement including a damper blade within a flow-through conduit which opens and closes a port therein, the damper blade being attached to a shaft which extends outside of the conduit, where the shaft is connected to a drive system for imparting motion thereto, the shaft being sealed at its point of exit through the conduit wall by a packing gland, the packing gland being isolated from fluid pressure within the conduit by a compressible gasket wall means disposed intermediate the inner face of the conduit and the face of the damper blade opposite the port to surround the packing gland and form a sealed chamber therearound with the damper blade when the damper is fully opened.

5 Claims, 2 Drawing Figures

PATENTED SEP 18 1973  3,759,486

DAMPER SEAL SYSTEM

BACKGROUND OF THE INVENTION

Prior art damper arrangements, similar to the type commonly referred to as Bullseye dampers, are generally unsuitable for use in conduits to control the ingress of pressurized fluids because each has a movable shaft, which supports the blade and extends through the conduit wall which must be sealed with respect thereto, and the packing gland which is provided and which seals the shaft is subject to failure upon repeated exposure to high fluid pressures. Such packing glands allow at least slight amounts of fluid to escape because of the necessity of having the shaft moving therethrough, and, upon repeated exposure to pressurized fluids, soon begin to allow major amounts of leakage from the conduit. The present invention prevents early packing gland failure and avoids leakage by providing a gasket wall means which circumscribes the shaft and abuts, in sealing relationship, the damper blade when the damper is in its full open position, thus isolating the packing gland and preventing it from being subjected to high fluid pressures. The present invention provides a straightforward, inexpensive, readily constructed and easily maintained gasket arrangement which protects the packing gland of a Bullseye type damper.

SUMMARY OF THE INVENTION

The present invention provides a gasket wall means in a Bullseye type damper arrangement which isolates the packing gland from excessive pressures while the damper is in its full open position. More specifically, the present invention provides a damper arrangement comprising: a conduit means having a flow-through port located therein; a port closing blade movably positioned between an open position and a closed position in relation to the port; actuating means for moving the blade relative to the port, the actuating means including a shaft attached to the blade and extending outside of the conduit where it is connected to a drive means imparting motion thereto; a packing gland providing a fluid tight seal around the shaft at its point of exit from the conduit means; and, a fluid tight compressible gasket wall means disposed intermediate the inner face of the conduit and the face of the damper blade opposite the port to surround the packing gland and form a sealed chamber therearound with the damper blade when the damper is in its full open position. The damper arrangement of this disclosure has been found to be particularly useful in prolonging the life of a packing gland which would normally be exposed to pressure when the damper blade is in its full open position.

DESCRIPTION OF THE PREFERRED EMBODIMENT

Figure 1:
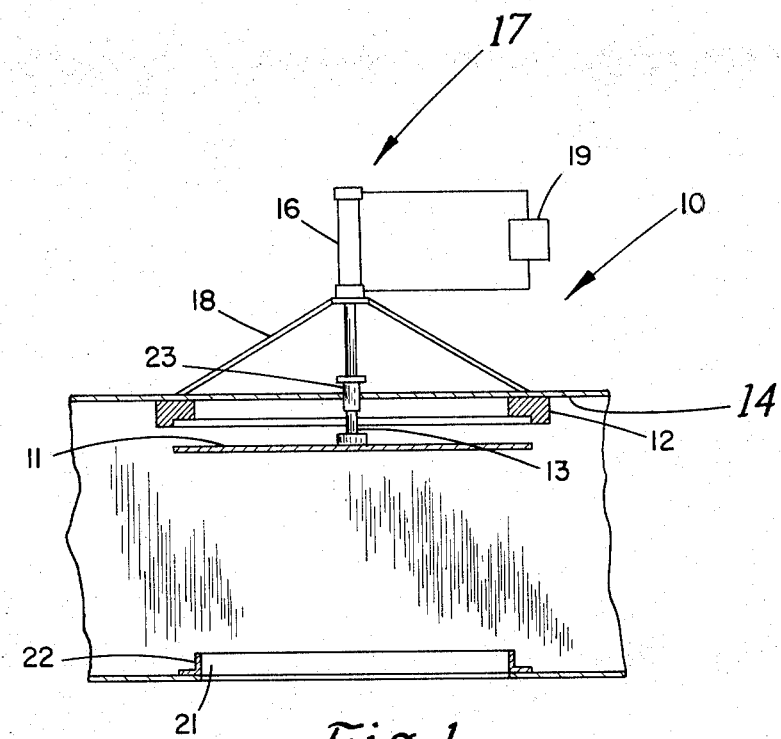
FIG. 1 is an elevational view partially in cross-section of one embodiment of the invention of this disclosure.

In FIG. 1 damper arrangement 10 is shown in open position having blade 11 aligned to engage in fluid tight relationship with gasket wall means 12 which circumscribes shaft 13. Blade 11 is connected to shaft 13 which extends through conduit 14 and is attached to actuating means 17. Actuating means 17 includes shaft 13, drive means 16, which may be a hydraulic or air actuated cylinder, frame 18 and control means 19. Control means 19 is generally a simple switch arrangement, supplying power to drive means 16, which may be selectively operated to open or close damper arrangement 10. Flow-through port 21 is located in line with blade 11 in opposed relationship thereto and is circumscribed by valve seat 22. Actuating means 17 allows blade 11 to be positioned in fluid tight relationship with ported valve seat 22, thus preventing fluid from entering conduit 14. In such a position the damper arrangement is in its fully closed position. In its fully closed position the conduit is not pressurized, consequently there is no pressure being exerted on packing gland 23 which surrounds and seals shaft 13 at its point of exit from the conduit 14. However, when control means 19 is actuated and blade 11 is moved upwardly, pressurized fluid enters into conduit 14 and packing gland 23 becomes subjected to the pressure of such entering fluid. To prevent sustained pressure on packing gland 23, when damper arrangement 10 is in its full open position, gasket wall means 12 has been provided and positioned so that it is engaged by the upper edge of blade 11 in fluid tight sealing rotation therewith thus isolating packing gland 23 from continuous exposure; it being understood that any pressurized fluid, trapped between the conduit wall and the blade by the gasket wall, slowly escapes between the packing gland and shaft to leave the packing gland under no positive pressure.

Advantageously, port 21, valve seat 22, blade 11, and gasket wall means 12 are all circular; however, it is apparent that other shapes may be used for any or all of these items. Most advantageously, gasket wall means 12 is the same shape as blade 11, but it is not imperative that such be the case, as long as gasket wall means 12 is engaged around its entire periphery by blade 11 thereby isolating packing gland 23 from fluid pressure when damper arrangement 10 is in its full open position. In addition to being the same shape as blade 11, it is also advantageous to have gasket wall means 12 concentrically located with respect to blade 11. Again however, concentricity is not imperative, and the apparatus of this invention will function acceptably even if gasket wall means 12 is offset with respect to the center of blade 11 as long as it is engaged around its entire periphery by blade 11.

Figure 2:
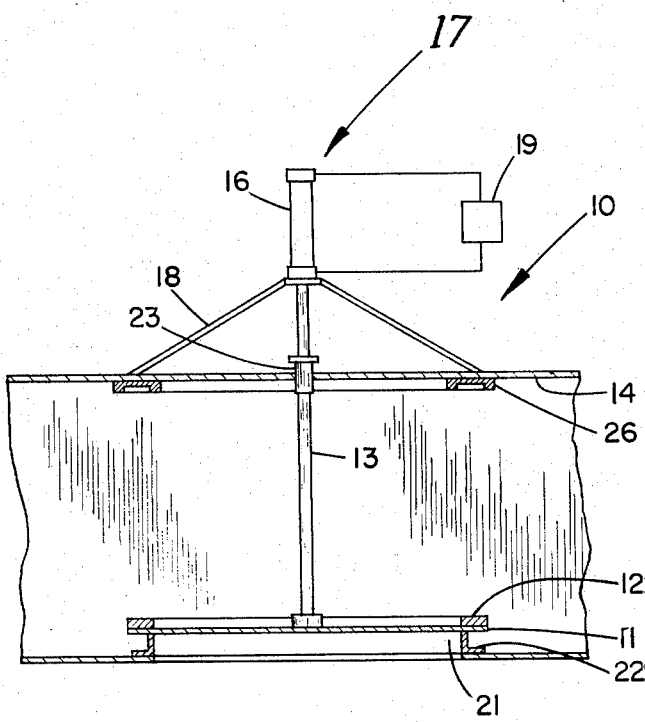
FIG. 2 is an elevational view partially in cross-section of an alternative embodiment of the invention of this disclosure.

FIG. 2 shows an alternative embodiment of the invention of this disclosure which includes attaching gasket wall means 12', in the form of a ring member, to the upper side of blade 11. This ring member may be comprised of a resilient sealing material such as rubber or other polymeric resinous material and can be received by channel member 26. As can be seen from FIG. 2 the function of providing gasket wall means 12' attached to blade 11 is identical to the function of blade 11 cooperating with gasket wall means 12 attached to the conduit wall as shown in FIG. 1. In both instances a fluid tight seal is effected between blade 11 and gasket wall means 12 when the damper arrangement is in its full open position. The damper arrangement of FIG. 2 is similar to the damper arrangement of FIG. 1 in that generally it is advantageous to have orifice 12, ported valve seat 22, blade 11, and gasket wall means 12 all circular and generally concentrically located with respect to each other. However, such is not imperative as long as the ring member of gasket wall means 12' engages conduit 14 or channel member 26, if such is provided, around its entire periphery when damper arrangement 10 is in its full open position.

In the embodiment shown in FIG. 2 it is of course possible to have the ring member of gasket wall means 12' and channel member 26 interchanged, with channel member 26 located on blade 11 and the ring member located on the blade side of conduit 14. Similarly, it is possible to have the material of construction interchanged with the ring member being of steel or other rigid material while circular channel member 26 is a resilient sealing material such as rubber or a polymeric resinous material.

Having thus described the invention what is claimed is:

1. A damper arrangement comprising: a conduit means having a flow-through port located therein: a port closing blade having an annular shaped wall means attached to the side opposite the port, said blade movably positioned between an open position and a closed position in relation to said port; actuating means for moving said blade relative to said port, said actuating means including a shaft attached to said blade and extending outside of said conduit where it is connected to a drive means imparting motion thereto; a packing gland providing a fluid tight seal around said shaft at its point of exit from said conduit means; and, a fluid tight wall receiving means of U-shaped cross section attached to the inner face of said conduit to receive said annular shaped wall attached to the face of said damper blade opposite said port to surround said packing gland and form a sealed chamber therearound with said damper blade when said damper is in its full open position.

2. The apparatus of claim 1 wherein said port, said blade, said wall means and said wall receiving means are all generally circular in shape.

3. The apparatus of claim 2 wherein said blade, said port, said wall means and said wall receiving means are all generally concentric with respect to each other.

4. The apparatus of claim 3 wherein said wall means is comprised of gasket material and said wall receiving means is of metal construction.

5. The apparatus of claim 3 wherein said wall means is of metal construction and said wall receiving means is of gasket material.

* * * * *